Sept. 6, 1927.

J. G. PATY 1,641,454

INDICATING INSTRUMENT

Filed Dec. 7, 1925

Fig. 1.

Patented Sept. 6, 1927.

1,641,454

UNITED STATES PATENT OFFICE.

JOHN G. PATY, OF ST. LOUIS, MISSOURI.

INDICATING INSTRUMENT.

Application filed December 7, 1925. Serial No. 73,702.

This invention relates to indicating instruments, and has special reference to an indicating instrument for use upon an instrument board of an automobile, or elsewhere, in which it can be conveniently observed and which will operate to indicate with required precision the amount of gasoline in the gasoline tank supported elsewhere on the automobile.

While the instrument is designed and adapted specially for the purpose mentioned, it may be applied to other uses as, for instance, to indicate the amount of liquid contained in tanks or vessels irrespective of their location.

An object of the invention is to provide an indicating instrument arranged to be operated by pressure of a confined column of liquid and which embodies an improved compensating device that acts under the influence of heat and cold to compensate for the expansion and contraction of the column of liquid, so that the instrument will operate with approximate accuracy irrespective of changes in temperature.

Another object of the invention is to provide an instrument of the character and for the purpose mentioned having means for obtaining and maintaining the parts in proper adjustment for accurate operation.

Another object of the invention is to provide an improved indicating instrument possessing all of the advantages herein disclosed and which may be manufactured and sold at comparatively small cost.

Fig. 1 is an end elevation of my improved indicator.

Fig. 2 is a side elevation.

Fig. 3 is a sectional view.

Fig. 4 is a view looking into the housing showing the diaphragm and actuating lever.

Fig. 5 is a view showing a part of the connections by which the pointer is operated from the diaphragm.

A tubular part 1 opens through the end wall of the housing 2 and constitutes means for connection with a pipe or tube (not shown) confining a column of liquid to act against the circular diaphragm 3 secured within the housing adjacent to the end wall thereof. The diaphragm 3 is formed with circular corrugations and responds readily to any variation of pressure. A U-shaped compensator 4, composed of two integrally united strips of different metals having unequal coefficients of expansion and contraction, is attached to the center of the diaphragm 3. This compensator is arranged so that it will contract under the influence of heat to the same extent that the liquid acting against the opposite side of the diaphragm expands under the heat, and vice versa.

A face plate 5 is mounted in the opposite end of the housing from the diaphragm 3, being retained against a shoulder 6 in the housing by a ring 7 which also holds the dial 8 in place and which is provided with a graduated scale 9 to indicate empty or full conditions of the gasoline tank, and amounts of gasoline between empty and full condition.

A pointer 10 is mounted on a pivot 11 on the inner side of the face plate 5 and is bent to extend through an arcuate slot 12 so as to operate adjacent to the dial 8 and point to the scale 9. A lever 13 is mounted on a pivot 14 on the inner side of the face plate 5 and has pin and slot connection 15 with the pointer 10. A spring 16 is engaged with the pivot 14 and with the lever 13 and tends to move the lever 13 in a direction to move the pointer 10 toward "Empty" indication on the scale 9.

An arm 17, which may be described as of goose neck conformation, is attached to the inside of the housing 2 and supports a lever 18 one end of which contacts with the compensator 4 and the other end of which extends into a slot 19 in the lever 13. A screw 20 extends through a wall of the housing 2 and contacts with the arm 17. This screw functions as an adjuster whereby the arm 17 may be slightly bent or released to adjust the lever 18 in the exact relationship to the compensator required to obtain accurate operation of the instrument. After the arm 17 has been set by the adjuster 20 the latter may be made rigid by a drop of solder to bind it to the housing.

From the foregoing it will be seen that my invention is an indicator that responds accurately to variation of pressure against the diaphragm 3 and that the parts are maintained in proper relationship for accurate operation, irrespective of changes in temperature. The device may be manufactured and sold at comparatively low cost and may be mounted for use without difficulty. The specific construction and arrangement of the parts may be varied without departure from the nature and principle of the invention, and I do not restrict myself in any unessential particulars, but what I claim and desire to secure by Letters Patent is:—

1. An indicating instrument comprising a housing having a liquid inlet opening through one wall, a diaphragm in the housing, a curved arm in the housing having one end attached to the housing wall and the other end curving toward and terminating approximately at the axis of the housing, a lever pivoted near the latter end of said arm, an element in connection with said diaphragm contacting with said lever and arranged to contract under heat in the approximate ratio that the liquid admitted through said opening expands under heat, a lever pivoted near one side of said housing and having a slot into which said first lever extends, and an indicator device pivoted near the opposite side of said housing and being engaged and operated by said second lever.

2. An indicating instrument comprising a housing having a liquid inlet opening through one wall, a diaphragm in the housing, an element in connection with said diaphragm that contracts under heat in the approximate ratio that the liquid admitted through said opening expands under heat, an indicator device pivoted in said housing, a lever pivoted in said housing at a distance from the axis on which said indicator device is pivoted and engaging said indicator device, a curved arm having one end attached to the wall of the housing between said diaphragm and said indicator device and having the other end curving inwardly and toward said element, and a lever pivoted on said arm and having one end contacting with said element and the other end operatively connected up with said first lever.

3. An indicating instrument comprising a housing having a liquid inlet opening through one wall, a diaphragm in the housing, an element in connection with said diaphragm that contracts under heat in the approximate ratio that the liquid admitted through said opening expands under heat, an indicator device pivoted in said housing, a curved arm having one end attached to the wall of the housing between said diaphragm and said indicator device and having the other end curving inwardly and toward said element, a lever pivoted on said arm and having one end contacting with said element and the other end operatively connected up with said indicator device, and means supported in the housing for bending said arm toward said element.

4. An indicating instrument comprising a housing having a liquid inlet opening through one wall, a diaphragm in the housing opposite said inlet, an indicator device pivoted in said housing, a lever pivoted in said housing at a distance from the axis on which said indicator device is pivoted and engaging said indicating device, an arm having one end attached to the wall of the housing between said diaphragm and said indicator device and having the other end curving inwardly and toward said diaphragm, and a lever pivoted on said arm for operation by said diaphragm and having one end engaging said first lever.

5. An indicating instrument comprising a housing having a liquid inlet opening through one wall, a diaphragm in the housing opposite said inlet, an indicator device pivoted in said housing, a lever for moving said indicating device, an arm having one end attached to the wall of the housing between said diaphragm and said indicator device and having the other end curving inwardly and toward said diaphragm, a lever pivoted on said arm for operation by said diaphragm and having one end engaging said first lever, and means supported by the housing for bending said arm toward said diaphragm and holding said arm in the position to which it is bent.

6. An indicating instrument, comprising a housing, a diaphragm secured within the housing, means for admitting liquid to the housing to actuate the diaphragm in one direction, a face plate within the housing, a pointer pivoted to the inner side of said face plate, a lever pivoted to the inner side of said face plate having operative connection with said pointer, a spring for operating said lever in one direction, a compensating element in connection with the diaphragm arranged to contract under the influence of heat in the ratio that the liquid admitted to the housing expands under the influence of heat, and a lever supported in the housing having one end engaging said element and the opposite end engaging said first named lever.

7. An indicating instrument, comprising a housing, a diaphragm secured within the housing, means for admitting liquid to the housing to actuate the diaphragm in one direction, a face plate within the housing, a pointer pivoted to the inner side of said face plate, a lever pivoted to the inner side of said face plate having operative connection with said pointer, a spring for operating said lever in one direction, a compensating element in connection with the diaphragm arranged to contract under the influence of heat in the ratio that the liquid admitted to the housing expands under the influence of heat, a lever supported in the housing having one end engaging said element and the opposite end engaging said first named lever, and means supported by the housing for adjusting said second lever in proper relationship to said compensating element and said first named lever.

JOHN G. PATY.